(12) United States Patent
Yu

(10) Patent No.: US 9,894,568 B2
(45) Date of Patent: Feb. 13, 2018

(54) METHOD FOR POLICY CONVERGING, UE, AND SERVER

(71) Applicant: Huawei Technologies Co., Ltd., Shenzhen, Guangdong (CN)

(72) Inventor: Youyang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 14/868,802

(22) Filed: Sep. 29, 2015

(65) Prior Publication Data
US 2016/0021582 A1 Jan. 21, 2016

Related U.S. Application Data

(63) Continuation of application No. PCT/CN2013/073406, filed on Mar. 29, 2013.

(51) Int. Cl.
*H04W 36/00* (2009.01)
*H04W 48/16* (2009.01)
*H04W 48/18* (2009.01)

(52) U.S. Cl.
CPC ....... *H04W 36/0055* (2013.01); *H04W 48/16* (2013.01); *H04W 48/18* (2013.01)

(58) Field of Classification Search
CPC .. H04W 36/0055; H04W 48/16; H04W 48/18
USPC .... 455/414.1, 418–420, 432.1–436; 370/331
See application file for complete search history.

(56) References Cited

U.S. PATENT DOCUMENTS

| 2010/0205293 A1* | 8/2010 | Hu | G06Q 10/00 709/224 |
| 2012/0014266 A1* | 1/2012 | Diaz | H04L 41/12 370/252 |
| 2013/0041981 A1* | 2/2013 | Kim | H04W 48/16 709/217 |
| 2013/0252578 A1* | 9/2013 | So | H04M 15/66 455/406 |

(Continued)

FOREIGN PATENT DOCUMENTS

| CN | 101730188 A | 6/2010 |
| CN | 101730202 A | 6/2010 |
| CN | 101945446 A | 1/2011 |

(Continued)

OTHER PUBLICATIONS

"UE based policy conflict resolution", CATT, SA WG2 Meeting #95, Jan. 28-Feb. 1, 2013, 3 pages, S2-130243.

(Continued)

*Primary Examiner* — Michael Mapa

(57) ABSTRACT

A method for policy converging, a UE, and a server are provided. The method includes: sending, by a UE, a policy request message to a first policy server; receiving a policy response message from the first policy server, where the policy response message includes first policy information of the first policy server and information about at least one piece of second policy information; acquiring the at least one piece of second policy information according to the information about the at least one piece of second policy information; and converging, according to the policy response message, the first policy information and the at least one piece of second policy information to generate converged policy information.

13 Claims, 6 Drawing Sheets

(56) References Cited

U.S. PATENT DOCUMENTS

2014/0010222 A1* 1/2014 Chen ................... H04W 48/16
370/338
2015/0327153 A1* 11/2015 Tervonen .............. H04W 48/08
370/235

FOREIGN PATENT DOCUMENTS

EP          2 437 558 A1    4/2012
WO    WO 2012/156581 A1   11/2012

OTHER PUBLICATIONS

"UE handling of policies from H-ANDSF and V-ANDSF", Motorola, Change Request, 3GPP TSG-SA WG2 Meeting #71, Feb. 16-20, 2009, 3 pages, S2-091759.

"3rd Generation Partnership Project; Technical Specification Group Service and System Aspects; Architecture enhancements for non-3GPP accesses (Release 12)", 3GPP TS 23.402 V12.0.0, Mar. 2013, 253 pages.

"3rd Generation Partnership Project; Technical Specification Group Core Network and Terminals; Access Network Discovery and Selection Function (ANDSF) Management Object (MO) (Release 12)", 3GPP TS 24.312 V12.0.0, Mar. 2013, 173 pages.

"3rd Generation Partnership Project; Technical Specification Group Core Network and Terminals; Access to the 3GPP Evolved Packet Core (EPC) via non-3GPP access networks; Stage 3 (Release 12)", 3GPP TS 24.302 V12.0.0, Mar. 2013, 61 pages.

* cited by examiner

US 9,894,568 B2

METHOD FOR POLICY CONVERGING, UE, AND SERVER

CROSS-REFERENCE TO RELATED APPLICATIONS

This application is a continuation of International Application No. PCT/CN2013/073406 filed on Mar. 29, 2013, which is hereby incorporated by reference in its entirety.

TECHNICAL FIELD

The present invention relates to the field of communications technologies, and in particular, to a method for policy converging, user equipment (UE), and a server.

BACKGROUND

At present, the up-to-date 3rd Generation Partnership Project (3GPP) core network not only supports 3GPP access technologies, for example, a Mobile Telecommunications System (Universal Mobile Telecommunications System, UMTS) Terrestrial Radio Access Network (UTRAN) and a Global System for Mobile Communications (GSM) Edge Radio Access Network (GERAN), but also supports non-3GPP access technologies, for example, Code Division Multiple Access (CDMA)2000, Worldwide Interoperability for Microwave Access (WiMAX), and a wireless local area network (WLAN). An access network discovery and selection function (ANDSF) server may be deployed on a network side, and for a UE supporting multiple access technologies, the network side may send policy information to the UE by using the ANDSF server, so as to instruct the UE to select a suitable access network. With the development of a WLAN technology, a WLAN network gradually becomes a supplement to a 3GPP network; especially in a WLAN hotspot area, the WLAN network may offload some data streams so as to relieve load on a 3GPP backbone network.

For a 3GPP network, when a UE interacts with an ANDSF server by using the Internet Protocol (IP) after connecting to a network side, the ANDSF server is responsible for providing the UE with at least one type of policy information in access network discovery information, an inter-system handover policy, and an inter-system routing policy, and the UE decides, based on the policy information, a target network to which the UE is handed over. For a WLAN network, the WLAN network provides WLAN network state information and WLAN selection policy information by using a wireless fidelity (WiFi) alliance (WFA) server to a UE that accesses the WLAN network. As can be seen from that, when the 3GPP network and the WLAN network coexist, the ANDSF server and the WFA server may provide policy information to a UE at the same time, thereby leading to policy conflict; as a result, it may be caused that it is difficult for the UE to select a suitable policy to access a network.

SUMMARY

Embodiments of the present invention provide a method for policy converging, a UE, and a server, so as to solve a problem in the prior art that different servers on a network side provide policy information to a UE at the same time, thereby leading to policy conflict and making it difficult for the UE to access a network.

In order to solve the foregoing technical problem, the following technical solutions are disclosed in the embodiments of the present invention:

A first aspect provides a method for policy converging, where the method includes:
sending, by user equipment UE, a policy request message to a first policy server;
receiving, by the UE, a policy response message from the first policy server, where the policy response message includes first policy information of the first policy server and information about at least one piece of second policy information, and the at least one piece of second policy information is policy information of at least one second policy server;
acquiring, by the UE, the at least one piece of second policy information according to the information about the at least one piece of second policy information; and
converging, by the UE according to the policy response message, the first policy information and the at least one piece of second policy information to generate converged policy information.

With reference to the first aspect, in a first possible implementation manner of the first aspect, the information about the at least one piece of second policy information is used as a policy convergence indication.

With reference to the first aspect, in a second possible implementation manner of the first aspect, the policy response message further includes a policy convergence indication.

With reference to the first possible implementation manner of the first aspect, or the second possible implementation manner of first aspect, in a third possible implementation manner of the first aspect, the policy convergence indication is used for indicating any one of the following converging manners:
the converged policy information is policy information with a highest priority in the first policy information and the at least one piece of second policy infon iation;
for a same target access network, policy items in the converged policy information are a union set of a policy item in the first policy information and a policy item in the at least one piece of second policy information; and
for a same target access network, each policy item in the converged policy information is a policy item with a highest priority in policy items of a same type in the first policy information and the at least one piece of second policy information.

With reference to the first possible implementation manner of the first aspect, or the second possible implementation manner of the first aspect, or the third possible implementation manner of the first aspect, in a fourth possible implementation manner of the first aspect, the policy convergence indication is a policy convergence indication determined by the first policy server according to at least one relationship in a configuration relationship, a location relationship, and a roaming relationship between the first policy server and the at least one second policy server.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect,
the policy request message includes an identifier of at least one second policy server found by the UE, so that the first policy server selects the at least one second policy server for the UE; or
the policy request message includes an identifier of at least one piece of second policy information of at least one second policy server found by the UE, so that the first policy server selects the identifier of the at least one piece of second policy information for the UE.

With reference to the fifth possible implementation manner of the first aspect, in a sixth possible implementation manner of the first aspect, when the policy request message includes the identifier of the at least one second policy server found by the UE, the information that is about the at least one piece of second policy information and included in the policy response message includes the identifier of the at least one second policy server; and when the policy request message includes the identifier of the at least one piece of second policy information of the at least one second policy server found by the UE, the information that is about the at least one piece of second policy information and included in the policy response message includes the identifier of the at least one piece of second policy information.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, in a seventh possible implementation manner of the first aspect, the policy request message includes capability information of the UE, where the capability information is used for indicating that the UE supports policy convergence, or used for indicating a converging manner supported by the UE, so that the first policy server selects, for the UE according to the converging manner supported by the UE, a converging manner used for generating the converged policy information.

A second aspect provides a method for policy converging, where the method includes:

receiving, by a first policy server, a policy request message sent by user equipment UE; and sending, by the first policy server, a policy response message to the UE, where the policy response message includes first policy information of the first policy server and information about at least one piece of second policy information, the at least one piece of second policy information is policy information of at least one second policy server, and the policy response message is used for instructing the UE to acquire the at least one piece of second policy information according to the information about the at least one piece of second policy information, and converge the first policy information and the at least one piece of second policy information to generate converged policy information.

With reference to the second aspect, in a first possible implementation manner of the second aspect, the information about the at least one piece of second policy information is used as a policy convergence indication.

With reference to the second aspect, in a second possible implementation manner of the second aspect, the policy response message further includes a policy convergence indication.

With reference to the first possible implementation manner of the second aspect, or the second possible implementation manner of second aspect, in a third possible implementation manner of the second aspect, the policy convergence indication is used for indicating any one of the following converging manners:

the converged policy information is policy information with a highest priority in the first policy information and the at least one piece of second policy information;

for a same target access network, policy items in the converged policy information are a union set of a policy item in the first policy information and a policy item in the at least one piece of second policy information; and for a same target access network, each policy item in the converged policy information is a policy item with a highest priority in policy items of a same type in the first policy information and the at least one piece of second policy information.

With reference to the first possible implementation manner of the second aspect, or the second possible implementation manner of the second aspect, or the third possible implementation manner of the second aspect, in a fourth possible implementation manner of the second aspect, before the sending, by the first policy server, a policy response message to the UE, the method further includes:

determining, by the first policy server, the policy convergence indication according to at least one relationship in a configuration relationship, a location relationship, and a roaming relationship between the first policy server and the at least one second policy server.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner of the second aspect, the method further includes:

when the policy request message includes an identifier of at least one second policy server found by the UE, selecting, by the first policy server, the at least one second policy server for the UE; or when the policy request message includes an identifier of at least one piece of second policy information of at least one second policy server found by the UE, selecting, by the first policy server, the identifier of the at least one piece of second policy information for the UE.

With reference to the fifth possible implementation manner of the second aspect, in a sixth possible implementation manner of the second aspect, when the policy request message includes the identifier of the at least one second policy server found by the UE, the information that is about the at least one piece of second policy information and included in the policy response message includes the identifier of the at least one second policy server; and when the policy request message includes the identifier of the at least one piece of second policy information of the at least one second policy server found by the UE, the information that is about the at least one piece of second policy information and included in the policy response message includes the identifier of the at least one piece of second policy information.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, in a seventh possible implementation manner of the second aspect, the policy request message includes capability information of the UE, where the capability information is used for indicating that the UE supports policy convergence, or used for indicating a converging manner supported by the UE; and the method further includes: selecting, by the first policy server for the UE according to the converging manner supported by the UE, a converging manner used for generating the converged policy information.

A third aspect provides a UE, where the UE includes:

a sending unit, configured to send a policy request message to a first policy server;

a receiving unit, configured to receive a policy response message from the first policy server, where the policy response message includes first policy information of the first policy server and information about at least one piece of second policy information, and the at least one piece of second policy information is policy information of at least one second policy server;

an acquiring unit, configured to acquire the at least one piece of second policy information according to the information about the at least one piece of second policy information; and a converging unit, configured to converge, according to the policy response message, the first policy information and the at least one piece of second policy information to generate converged policy information.

With reference to the third aspect, in a first possible implementation manner of the third aspect, the information that is about the at least one piece of second policy information and included in the policy response message received by the receiving unit is used as a policy convergence indication; or the policy response message received by the receiving unit further includes a policy convergence indication.

With reference to the first possible implementation manner of the third aspect, in a second possible implementation manner of the third aspect, the policy convergence indication is used for indicating any one of the following converging manners:

the converged policy information is policy information with a highest priority in the first policy information and the at least one piece of second policy information;

for a same target access network, policy items in the converged policy information are a union set of a policy item in the first policy information and a policy item in the at least one piece of second policy information; and for a same target access network, each policy item in the converged policy information is a policy item with a highest priority in policy items of a same type in the first policy information and the at least one piece of second policy infoi illation.

With reference to the first possible implementation manner of the third aspect, or the second possible implementation manner of the third aspect, in a third possible implementation manner of the third aspect, the policy convergence indication is a policy convergence indication determined by the first policy server according to at least one relationship in a configuration relationship, a location relationship, and a roaming relationship between the first policy server and the at least one second policy server.

With reference to the third aspect, or the first possible implementation manner of the third aspect, or the second possible implementation manner of the third aspect, or the third possible implementation manner of the third aspect, in a fourth possible implementation manner of the third aspect, the policy request message sent by the sending unit includes an identifier of at least one second policy server found by the UE, so that the first policy server selects the at least one second policy server for the UE; or the policy request message sent by the sending unit includes an identifier of at least one piece of second policy information of at least one second policy server found by the UE, so that the first policy server selects the identifier of the at least one piece of second policy information for the UE.

With reference to the fourth possible implementation manner of the third aspect, in a fifth possible implementation manner of the third aspect, when the policy request message sent by the sending unit includes the identifier of the at least one second policy server found by the UE, the information that is about the at least one piece of second policy information and included in the policy response message received by the receiving unit includes the identifier of the at least one second policy server; and when the policy request message sent by the sending unit includes the identifier of the at least one piece of second policy information of the at least one second policy server found by the UE, the information that is about the at least one piece of second policy information and included in the policy response message received by the receiving unit includes the identifier of the at least one piece of second policy information.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner of the third aspect, the policy request message sent by the sending unit includes capability information of the UE, where the capability information is used for indicating that the UE supports policy convergence, or used for indicating a converging manner supported by the UE, so that the first policy server selects, for the UE according to the converging manner supported by the UE, a converging manner used for generating the converged policy information.

A fourth aspect provides a UE, where the UE includes: a bus, and a network interface and a processor that are connected by using the bus, where the network interface is configured to connect to a policy server in a network; and the processor is configured to send a policy request message to a first policy server through the network interface; receive, through the network interface, a policy response message from the first policy server, where the policy response message includes first policy information of the first policy server and information about at least one piece of second policy information, and the at least one piece of second policy information is policy information of at least one second policy server; acquire the at least one piece of second policy information according to the information about the at least one piece of second policy information; and converge, according to the policy response message, the first policy information and the at least one piece of second policy information to generate converged policy information.

With reference to the fourth aspect, in a first possible implementation manner of the fourth aspect, the information that is about the at least one piece of second policy information and included in the policy response message received by the processor through the network interface is used as a policy convergence indication; or the policy response message received by the processor through the network interface further includes a policy convergence indication.

With reference to the first possible implementation manner of the fourth aspect, in a second possible implementation manner of the fourth aspect, the policy convergence indication is used for indicating any one of the following converging manners:

the converged policy information is policy information with a highest priority in the first policy information and the at least one piece of second policy information;

for a same target access network, policy items in the converged policy information are a union set of a policy item in the first policy information and a policy item in the at least one piece of second policy information; and for a same target access network, each policy item in the converged policy information is a policy item with a highest priority in policy items of a same type in the first policy information and the at least one piece of second policy information.

With reference to the first possible implementation manner of the fourth aspect, or the second possible implementation manner of the fourth aspect, in a third possible implementation manner of the fourth aspect, the policy convergence indication is a policy convergence indication determined by the first policy server according to at least one relationship in a configuration relationship, a location relationship, and a roaming relationship between the first policy server and the at least one second policy server.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the policy request message sent by the processor through the network interface includes an identifier of at least one second policy server found by the UE, so that the first policy server selects the at least one second policy server for the UE; or the policy request message sent by the processor through the network interface includes an identifier of at least one piece of second policy information of at least one second policy server found by the UE, so that the first policy server selects the identifier of the at least one piece of second policy information for the UE.

With reference to the fourth possible implementation manner of the fourth aspect, in a fifth possible implementation manner of the fourth aspect, when the policy request message sent by the processor through the network interface includes the identifier of the at least one second policy server found by the UE, the information that is about the at least one piece of second policy information and included in the policy response message received by the processor through the network interface includes an identifier of the at least one second policy server; and when the policy request message sent by the processor through the network interface includes the identifier of the at least one piece of second policy information of the at least one second policy server found by the UE, the information that is about the at least one piece of second policy information and included in the policy response message received by the processor through the network interface includes the identifier of the at least one piece of second policy information.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, in a sixth possible implementation manner of the fourth aspect, the policy request message sent by the processor through the network interface includes capability information of the UE, where the capability information is used for indicating that the UE supports policy convergence, or used for indicating a converging manner supported by the UE, so that the first policy server selects, for the UE according to the converging manner supported by the UE, a converging manner used for generating the converged policy information.

A fifth aspect provides a server, where the server serves as a first policy server, and includes:

a receiving unit, configured to receive a policy request message sent by user equipment UE; and a sending unit, configured to send a policy response message to the UE, where the policy response message includes first policy information of the first policy server and information about at least one piece of second policy information, the at least one piece of second policy information is policy information of at least one second policy server, and the policy response message is used for instructing the UE to acquire the at least one piece of second policy information according to the information about the at least one piece of second policy information, and converge the first policy information and the at least one piece of second policy information to generate converged policy information.

With reference to the fifth aspect, in a first possible implementation manner of the fifth aspect, the information that is about the at least one piece of second policy information and included in the policy response message sent by the sending unit is used as a policy convergence indication; or the policy response message sent by the sending unit further includes a policy convergence indication.

With reference to the first possible implementation manner of the fifth aspect, in a second possible implementation manner of the fifth aspect, the policy convergence indication is used for indicating any one of the following converging manners:

the converged policy information is policy information with a highest priority in the first policy information and the at least one piece of second policy information;

for a same target access network, policy items in the converged policy information are a union set of a policy item in the first policy information and a policy item in the at least one piece of second policy information; and for a same target access network, each policy item in the converged policy information is a policy item with a highest priority in policy items of a same type in the first policy information and the at least one piece of second policy information.

With reference to the first possible implementation manner of the fifth aspect, or the second possible implementation manner of the fifth aspect, in a third possible implementation manner of the fifth aspect, the server further includes:

a determining unit, configured to determine the policy convergence indication according to at least one relationship in a configuration relationship, a location relationship, and a roaming relationship between the first policy server and the at least one second policy server.

With reference to the fifth aspect, or the first possible implementation manner of the fifth aspect, or the second possible implementation manner of the fifth aspect, or the third possible implementation manner of the fifth aspect, in a fourth possible implementation manner of the fifth aspect, the server further includes:
  a first selecting unit, configured to: when the policy request message received by the receiving unit includes an identifier of at least one second policy server found by the UE, select the at least one second policy server for the UE; or when the policy request message received by the receiving unit includes an identifier of at least one piece of second policy information of at least one second policy server found by the UE, select the identifier of the at least one piece of second policy information for the UE.

With reference to the fourth possible implementation manner of the fifth aspect, in a fifth possible implementation manner of the fifth aspect,
  when the policy request message received by the receiving unit includes the identifier of the at least one second policy server found by the UE, the information that is about the at least one piece of second policy information and included in the policy response message sent by the sending unit includes the identifier of the at least one second policy server; and
  when the policy request message received by the receiving unit includes the identifier of the at least one piece of second policy information of the at least one second policy server found by the UE, the information that is about the at least one piece of second policy information and included in the policy response message sent by the sending unit includes the identifier of the at least one piece of second policy information.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, in a sixth possible implementation manner of the fifth aspect,
  the policy request message received by the receiving unit includes capability information of the UE, where the capability information is used for indicating that the UE supports policy convergence, or used for indicating a converging manner supported by the UE; and
  the server further includes: a second selecting unit, configured to: when the capability information is used for indicating a converging manner supported by the UE, select, for the UE according to the converging manner supported by the UE, a converging manner used for generating the converged policy information.

A sixth aspect provides a server, where the server serves as a first policy server, and includes: a bus, and a network interface and a processor that are connected by using the bus, where
  the network interface is configured to connect to a UE in a network; and
  the processor is configured to receive, through the network interface, a policy request message sent by the user equipment UE, and send a policy response message to the UE through the network interface, where the policy response message includes first policy information of the first policy server and information about at least one piece of second policy information, the at least one piece of second policy information is policy information of at least one second policy server, and the policy response message is used for instructing the UE to acquire the at least one piece of second policy information according to the information about the at least one piece of second policy information, and converge the first policy information and the at least one piece of second policy information to generate converged policy information.

With reference to the sixth aspect, in a first possible implementation manner of the sixth aspect,
  the information that is about the at least one piece of second policy information and included in the policy response message sent by the processor through the network interface is used as a policy convergence indication; or
  the policy response message sent by the processor through the network interface further includes a policy convergence indication.

With reference to the first possible implementation manner of the sixth aspect, in a second possible implementation manner of the sixth aspect, the policy convergence indication is used for indicating any one of the following converging manners:
  the converged policy information is policy information with a highest priority in the first policy information and the at least one piece of second policy information;
  for a same target access network, policy items in the converged policy information are a union set of a policy item in the first policy information and a policy item in the at least one piece of second policy information; and
  for a same target access network, each policy item in the converged policy information is a policy item with a highest priority in policy items of a same type in the first policy information and the at least one piece of second policy infoliation.

With reference to the first possible implementation manner of the sixth aspect, or the second possible implementation manner of the sixth aspect, in a third possible implementation manner of the sixth aspect, the processor is further configured to determine the policy convergence indication according to at least one relationship in a configuration relationship, a location relationship, and a roaming relationship between the first policy server and the at least one second policy server.

With reference to the sixth aspect, or the first possible implementation manner of the sixth aspect, or the second possible implementation manner of the sixth aspect, or the third possible implementation manner of the sixth aspect, in a fourth possible implementation manner of the sixth aspect,
  the processor is further configured to: when the policy request message received through the network interface includes an identifier of at least one second policy server found by the UE, select the at least one second policy server for the UE; or when the policy request message received through the network interface includes an identifier of at least one piece of second policy information of at least one second policy server found by the UE, select the identifier of the at least one piece of second policy information for the UE.

With reference to the fourth possible implementation manner of the sixth aspect, in a fifth possible implementation manner of the sixth aspect, when the policy request message received by the processor through the network interface includes the identifier of the at least one second policy server found by the UE, the information that is about the at least one piece of second policy information and included in the policy response message sent by the processor through the network interface includes the identifier of the at least one second policy server; and when the policy request message received by the processor through the network interface includes the identifier of the at least one piece of second policy information of the at least one second policy server found by the UE, the information that is about the at least one piece of second policy information and included in the policy response message sent by the processor through the network interface includes the identifier of the at least one piece of second policy information.

With reference to the sixth aspect, or the first possible implementation manner of the sixth aspect, or the second possible implementation manner of the sixth aspect, or the third possible implementation manner of the sixth aspect, or the fourth possible implementation manner of the sixth aspect, or the fifth possible implementation manner of the sixth aspect, in a sixth possible implementation manner of the sixth aspect, the policy request message received by the processor through the network interface includes capability information of the UE, where the capability information is used for indicating that the UE supports policy convergence, or used for indicating a converging manner supported by the UE; and the processor is further configured to: when the capability information is used for indicating a converging manner supported by the UE, select, for the UE according to the converging manner supported by the UE, a converging manner used for generating the converged policy information.

In the embodiments of the present invention, a UE sends a policy request message to a first policy server; the first policy server receives a policy response message, where the policy response message includes first policy information of the first policy server and information about at least one piece of second policy information, and the at least one piece of second policy information is policy information of at least one second policy server; and the UE acquires the at least one piece of second policy information according to the information about the at least one piece of second policy information, and converges, according to the policy response message, the first policy information and the at least one piece of second policy information to generate converged policy information. By applying the embodiments of the present invention, when there are at least two policy servers providing policy information to a UE at the same time, policy information of different policy servers can be converged, so that occurrence of policy conflict is prevented, and the UE can access a target network according to converged policy information.

BRIEF DESCRIPTION OF THE DRAWINGS

To describe the technical solutions in the embodiments of the present invention or more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following embodiments of the present invention provide a method for policy converging, a UE, and a server.

In the prior art, an ANDSF server and a WFA server may provide policy information to a UE at the same time, thereby leading to policy conflict and causing that it may be difficult for the UE to select a suitable policy to access a network. Therefore, in the embodiments of the present invention, when the foregoing problem is solved, when there are at least two policy servers providing network access policies to a UE at the same time, the UE accesses a network by using a converged policy.

In the following illustrated embodiments of the present invention, description is made by using policy convergence and access when two policy servers provide network access policies to a UE as an example, where the two policy servers separately are a first policy server and a second policy server, and forms of the first policy server and the second policy server are not limited in the embodiments of the present invention, for example, the first policy server may be an ANDSF server, and the second policy server may be a WFA server, or the second policy server may be another ANDSF server.

In the following embodiments of the present invention, a UE may be a static device or a mobile device, UEs may be distributed in an entire wireless network, the UE may be referred to as a terminal (terminal) or a mobile station (mobile station), and the UE may specifically be a personal digital assistant (Personal Digital Assistant, PDA), a wireless communications device, a laptop computer (laptop computer), or the like. A UE identifier is information that can uniquely identify the UE, for example, the UE identifier may be an international mobile subscriber identity (International Mobile Subscriber Identity, IMSI), an international mobile equipment identity (International Mobile Equipment ID, IMEI), or a mobile station international integrated services digital network number (MSISDN), which is not limited in the embodiments of the present invention.

To make a person skilled in the art better understand the technical solutions in the embodiments of the present invention, and make the foregoing objectives, features, and advantages of the embodiments of the present invention more comprehensible, the following further describes the technical solutions in the embodiments of the present invention in detail with reference to the accompanying drawings.

Figure 1A:
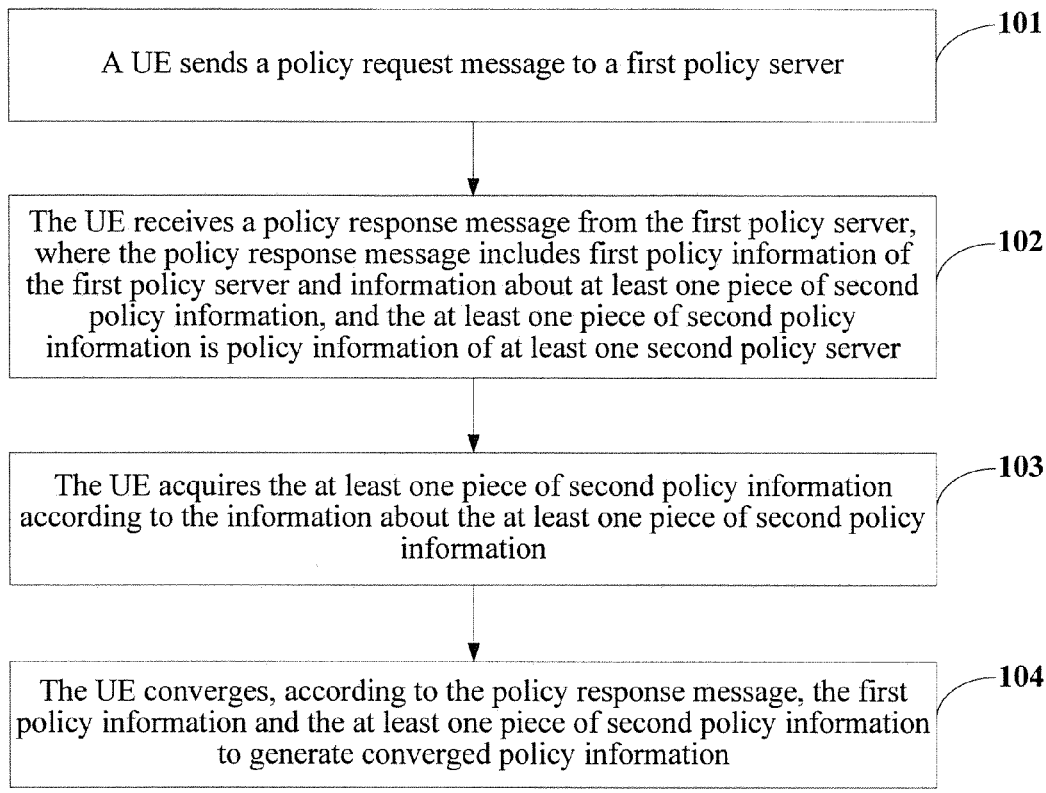
FIG. 1A is a flowchart of an embodiment of a method for policy converging according to the present invention.

Refer to FIG. 1A, which is a flowchart of an embodiment of a method for policy converging according to the present invention. In this embodiment, a policy convergence process is described from a UE side:

Step 101: A UE sends a policy request message to a first policy server.

Optionally, the policy request message may include an identifier of at least one second policy server found by the UE, so that the first policy server selects the at least one second policy server for the UE; or the policy request message may include an identifier of at least one piece of second policy information of at least one second policy server found by the UE, so that the first policy server selects the identifier of the at least one piece of second policy information for the UE.

Optionally, the policy request message may further include capability information of the UE, where the capability information is used for indicating that the UE supports policy convergence, or used for indicating a converging manner supported by the UE, so that the first policy server selects, for the UE according to the converging manner supported by the UE, a converging manner used for generating the converged policy information.

Step 102: The UE receives a policy response message from the first policy server, where the policy response message includes first policy information of the first policy server and information about at least one piece of second policy information, and the at least one piece of second policy information is policy information of at least one second policy server.

Optionally, the information that is about the at least one piece of second policy information and in the policy response message may be used as a policy convergence indication, or the policy response message may include a policy convergence indication. The policy convergence indication is used for indicating any one of the following converging manners: the converged policy information is policy information with a highest priority in the first policy information and the at least one piece of second policy information; for a same target access network, policy items in the converged policy information are a union set of a policy item in the first policy information and a policy item in the at least one piece of second policy information; and for a same target access network, each policy item in the converged policy information is a policy item with a highest priority in policy items of a same type in the first policy information and the at least one piece of second policy information. The policy convergence indication may be a policy convergence indication determined by the first policy server according to at least one relationship in a configuration relationship, a location relationship, and a roaming relationship between the first policy server and the at least one second policy server.

Optionally, when the policy request message includes the identifier of the at least one second policy server found by the UE, the information that is about the at least one piece of second policy information and included in the policy response message may include the identifier of the at least one second policy server; and when the policy request message includes the identifier of the at least one piece of second policy information of the at least one second policy server found by the UE, the information that is about the at least one piece of second policy information and included in the policy response message may include the identifier of the at least one piece of second policy information.

Step 103: The UE acquires the at least one piece of second policy information according to the information about the at least one piece of second policy information.

Step 104: The UE converges, according to the policy response message, the first policy information and the at least one piece of second policy information to generate converged policy information.

As can be seen from the foregoing embodiment, when there are at least two policy servers providing policy information to a UE at the same time, policy information of different policy servers can be converged, so that occurrence of policy conflict is prevented, and the UE can access a target network according to converged policy information.

Figure 1B:
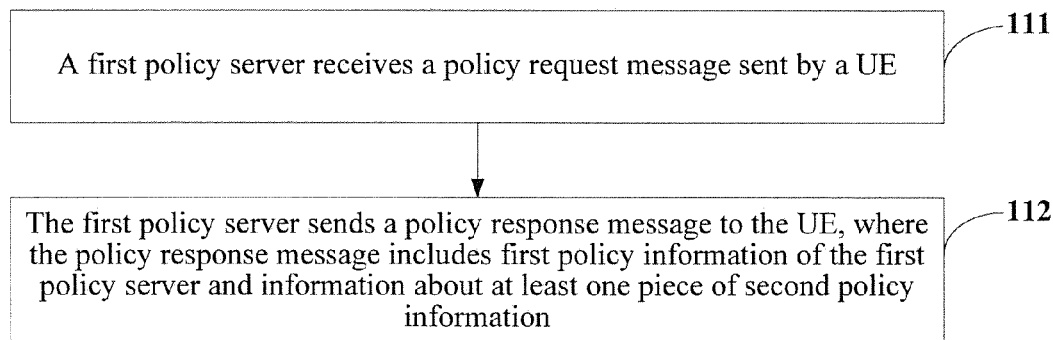
FIG. 1B is a flowchart of another embodiment of a method for policy converging according to the present invention.

Refer to FIG. 1B, which is a flowchart of another embodiment of a method for policy converging according to the present invention. In this embodiment, a policy convergence process is described from a policy server side:

Step 111: A first policy server receives a policy request message sent by a UE.

Optionally, when the policy request message includes an identifier of at least one second policy server found by the UE, the first policy server may select the at least one second policy server for the UE; or when the policy request message includes an identifier of at least one piece of second policy information of at least one second policy server found by the UE, the first policy server may select the identifier of the at least one piece of second policy information for the UE.

Optionally, the policy request message may further include capability information of the UE, where the capability information is used for indicating that the UE supports policy convergence, or used for indicating a converging manner supported by the UE; and correspondingly, the first policy server may select, for the UE according to the converging manner supported by the UE, a converging manner used for generating the converged policy information.

Step 112: The first policy server sends a policy response message to the UE, where the policy response message includes first policy information of the first policy server and information about at least one piece of second policy information.

The at least one piece of second policy information is policy information of at least one second policy server, and the policy response message is used for instructing the UE to acquire the at least one piece of second policy information according to the information about the at least one piece of second policy information, and converge the first policy information and the at least one piece of second policy information to generate converged policy information.

Optionally, the information that is about the at least one piece of second policy information and in the policy response message may be used as a policy convergence indication, or the policy response message may include a policy convergence indication. The policy convergence indication is used for indicating any one of the following converging manners: the converged policy information is policy information with a highest priority in the first policy information and the at least one piece of second policy information; for a same target access network, policy items in the converged policy information are a union set of a policy item in the first policy information and a policy item in the at least one piece of second policy information; and for a same target access network, each policy item in the converged policy information is a policy item with a highest priority in policy items of a same type in the first policy information and the at least one piece of second policy information. The policy convergence indication may be a policy convergence indication determined by the first policy server according to at least one relationship in a configuration relationship, a location relationship, and a roaming relationship between the first policy server and the at least one second policy server.

Optionally, when the policy request message includes the identifier of the at least one second policy server found by the UE, the information that is about the at least one piece of second policy information and included in the policy response message may include an identifier of the at least one second policy server; and when the policy request message includes the identifier of the at least one piece of second policy information of the at least one second policy server found by the UE, the information that is about the at least one piece of second policy information and included in the policy response message may include the identifier of the at least one piece of second policy information.

As can be seen from the foregoing embodiment, when there are at least two policy servers providing policy information to a UE at the same time, policy information of different policy servers can be converged, so that occurrence of policy conflict is prevented, and the UE can access a target network according to converged policy information.

Figure 2:
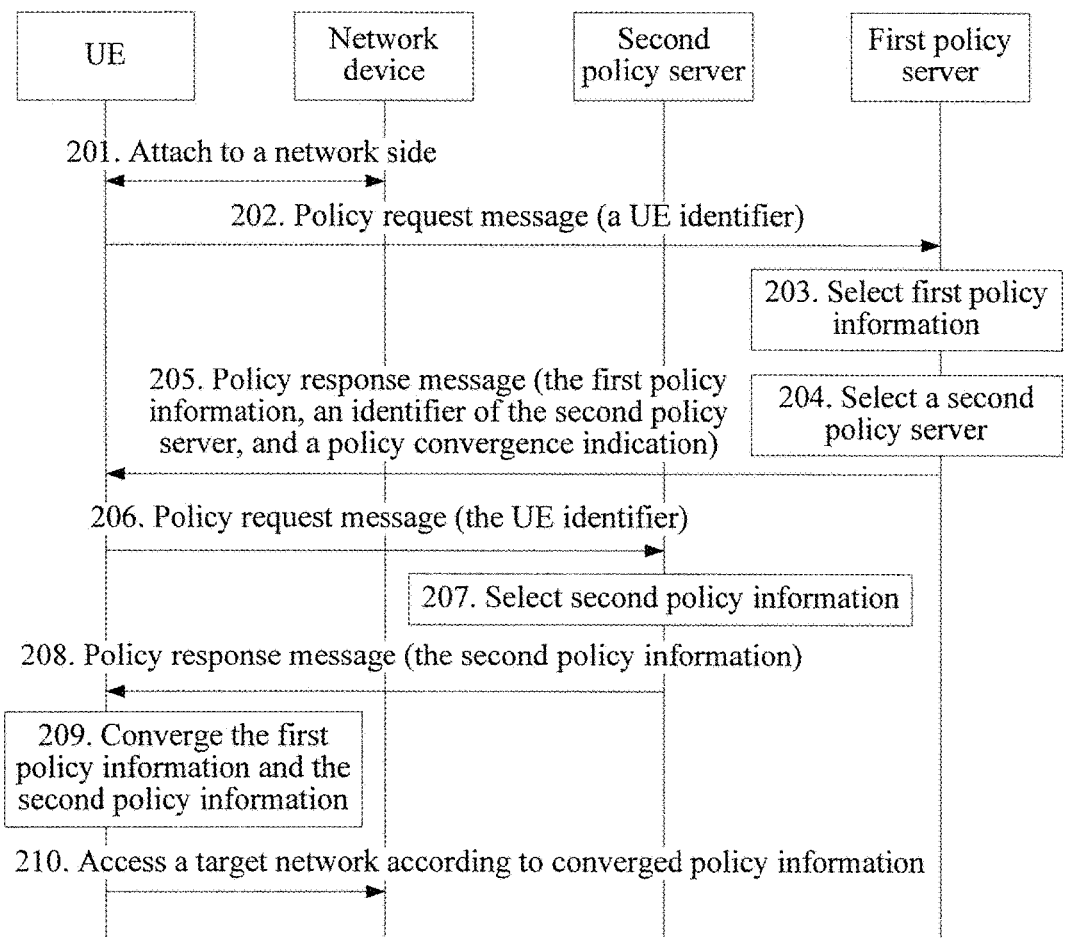
FIG. 2 is a flowchart of another embodiment of a method for policy converging according to the present invention.

Refer to FIG. 2, which is a flowchart of another embodiment of a method for policy converging according to the present invention. In this embodiment, policy convergence and network access processes are described by means of interaction between a UE and two policy servers:

Step 201: A UE attaches to a network side by interacting with a network device.

In this embodiment, a process of attaching to the network side by the UE is consistent with that in the prior art. In the attachment process, the UE needs to perform bidirectional authentication with the network side, and after the UE passes the authentication, the network device allocates an IP address for the UE, and the UE interacts, by using the IP address, with servers that are in an access network and include a first policy server and a second policy server. When the first policy server and the second policy server are servers on a same network side, the UE directly attaches to the network side. When the first policy server and the second policy server are servers on different network sides, the UE may select either one of the network sides for attachment, for example, when a 3GPP network and a WLAN network coexist, the UE may attach to the 3GPP network, or may attach to the WLAN network.

Step 202: The UE sends a policy request message to a first policy server, where the policy request message includes a UE identifier.

In this embodiment, besides the UE identifier, the policy request message may further include at least one type of information in location information of the UE, capability information of the UE, whether the UE supports concurrent access, and a type of a policy requested by the UE. The capability information of the UE may further include at least one of whether the UE supports the protocol Hot Spot 2.0, whether the UE supports the protocol 802.11u, and whether the UE can read policy information sent by a second policy server.

Step 203: The first policy server selects first policy information for the UE according to the received policy request message.

In this embodiment, the first policy server stores in advance a correspondence between the UE identifier and policy information to be allocated to the UE, where the policy information to be allocated to the UE is policy information that can be supported by the UE.

After receiving the policy request message, the first policy server queries the stored correspondence according to the UE identifier included in the policy request message, to obtain the policy information to be allocated to the UE, and selects at least one piece of policy information from the obtained policy information for the UE as the first policy information selected by the first policy server for the UE. The first policy server may use an existing manner to select the first policy information for the UE, for example, if the obtained policy information has a priority, one piece of policy information with a highest priority is selected from the obtained policy information as the first policy information; for another example, if the policy request message further carries the location information of the UE, one piece of policy information matching the location information of the UE may be selected as the first policy information according to a location that the policy information applies to; for another example, if the policy request message includes the type of the policy requested by the UE, one piece of policy information matching the type may be selected as the first policy information. As can be seen from that, the first policy server can flexibly select the first policy information for the UE according to a requirement or information carried in the policy request message, which is not limited in this embodiment of the present invention.

Step 204: The first policy server selects one second policy server for the UE, and obtains a second identifier of the second policy server.

In this embodiment, the first policy server may store in advance an identifier of a second policy server, and when there are multiple second policy servers, the first policy server selects one second policy server from the multiple second policy servers for the UE, and obtains an identifier of the second policy server. In this embodiment, a manner for the first policy server to select a second policy server is not limited, where the first policy server may select a second policy server based on the location information of the UE, for example, may select a second policy server nearest to a location of the UE.

Optionally, when the capability infon ation of the UE in the policy request message sent by the UE includes whether the UE can read policy information sent by a second policy server, the first policy server may select a second policy server for the UE only when the information indicates yes.

In this embodiment, an identifier of a policy server is information that can uniquely identify the policy server, and the identifier may be a fully qualified domain name (Fully Qualified Domain Name, FQDN) of the policy server, or an IP address of the policy server, or a name (Name) of the policy server, or a number (number) of the policy server, or the like.

Step 205: The first policy server returns a policy response message to the UE, where the policy response message includes the first policy information, the identifier of the second policy server, and a policy convergence indication.

In this embodiment, the policy convergence indication is used for indicating a manner for the UE to converge the first policy information of the first policy server and second policy information of the second policy server. Several possible converging manners are as follows:

a first converging manner, in which a priority of the first policy information is higher than that of the second policy information, and the UE selects an access network according to the first policy information, and at the same time, the UE may ignore the second policy information or use the second policy information as a supplement to the first policy information;

a second converging manner, in which a priority of the second policy information is higher than that of the first policy information, and the UE selects an access network according to the second policy information, and at the same time, the UE may ignore the first policy information or use the first policy information as a supplement to the second policy information; and a third converging manner, in which the first policy information and the second policy information are converged.

The foregoing three converging manners are merely exemplary, and another converging manner may be used according to a requirement during actual application, which is not limited in this embodiment of the present invention.

In this embodiment of the present invention, which converging manner is configured by the first policy server is not limited, either. For example, the first policy server may configure the policy convergence indication according to a network identifier of the second policy server, for example, a public land mobile network (Public Land Mobile Network, PLMN) ID, where when the second policy server and the first policy server belong to a same network, the first policy server may configure the second converging manner, or when the second policy server and the first policy server belong to different networks, but a roaming relationship exists between the different networks, the first policy server may configure the first or third converging manner. For the third converging manner, if, for example, a policy in the first policy server includes an identifier of a target access network, and a policy in the second policy server includes other limiting conditions for the target access network, when the third converging manner is used, the user equipment first checks whether the target access network meets the limiting conditions in the policy provided by the second policy server. If the target access network meets the limiting conditions, the target access network can be accessed.

Step 206: The UE sends a policy request message to the second policy server according to the second identifier in the policy response message, where the policy request message includes the UE identifier.

After receiving the policy response message returned by the first policy server, the UE obtains the first policy information, the identifier of the second policy server, and the policy convergence indication from the policy response message. The UE may establish a connection to the corresponding second policy server according to the second identifier by using the IP address allocated in step 201. After establishing the connection, the UE sends a policy request message including the UE identifier to the second policy server.

Optionally, similar to step 202, besides the UE identifier, the policy request message may further include at least one type of information in the location information of the UE, the capability information of the UE, whether the UE supports concurrent access, and the type of the policy requested by the UE. Details are not described herein again.

Step 207: The second policy server selects second policy information for the UE according to the received policy request message.

Similar to step 203, the second policy server also stores in advance a correspondence between the UE identifier and policy information to be allocated to the UE, where the policy information to be allocated to the UE is policy information that can be supported by the UE. After receiving the policy request message, the second policy server queries the stored correspondence according to the UE identifier included in the policy request message, to obtain the policy information to be allocated to the UE, and selects one piece of policy information from the obtained policy information for the UE as the second policy information selected by the second policy server for the UE. In addition, all second policy servers in a network may store universal policy information; therefore, after receiving the policy request message, the second policy server may use the universal policy information as the second policy information.

For a specific manner for the second policy server to select the second policy information, reference may be made to the description in step 203. Details are not described herein again.

Step 208: The second policy server returns a policy response message to the UE, where the policy response message includes the second policy information.

Step 209: The UE converges the first policy information and the second policy information according to the policy convergence indication.

Step 210: The UE accesses a target network according to converged policy information.

With reference to the three possible converging manners described in step 205, when the policy convergence indication indicates the first converging manner, the UE may select an access network by using the first policy information; when the policy convergence indication indicates the second converging manner, the UE may select an access network by using the second policy information; or when the policy convergence indication indicates the third converging manner, if, for example, the first policy information includes multiple selectable access networks, the UE may select one first target access network in an existing manner, acquire current state information of the first target access network, check whether the current state information meets an access network selection condition specified by the second policy information, and if the current state information meets the access network selection condition, use the first target access network as the target access network of the UE, or if the current state information does not meet the access network selection condition, the UE reselects one first target access network in a descending order of the access networks in the first policy information, and repeats the previous operations until one first target access network meeting the access network selection condition specified by the second policy information is selected as the target access network of the UE; for another example, if the first policy information indicates that at a current location, a first-preferred target cell of the UE is an SSID1, and a second-preferred cell is an SSID2, and the second policy information indicates that at the current location, the UE can access the target cell SSID1 only when load on the SSID1 is less than 70%, and a second-preferred cell is an SSID3, the converged policy information may indicate that a current first-preferred target cell of the UE is the SSID1, load on the SSID1 is less than 70%, and a second-preferred target cell is the SSID2.

As can be seen from the foregoing embodiment, when there are at least two policy servers providing policy information to a UE at the same time, policy information of different policy servers can be converged, so that occurrence of policy conflict is prevented, and the UE can access a target network according to converged policy information.

Figure 3:
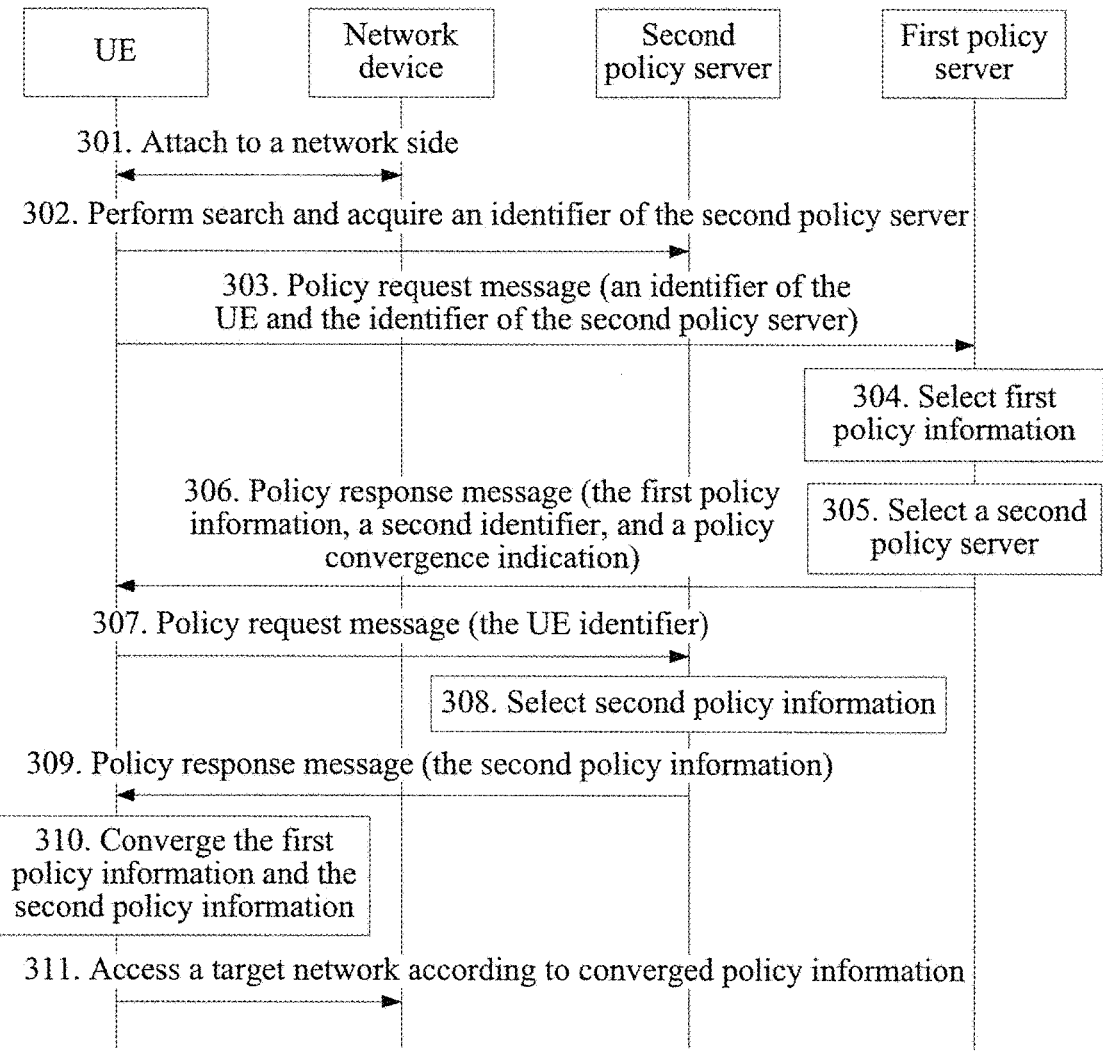
FIG. 3 is a flowchart of another embodiment of a method for policy converging according to the present invention.

Refer to FIG. 3, which is a flowchart of another embodiment of a method for policy converging according to the present invention. In this embodiment, policy convergence and network access processes are described by means of interaction between a UE and two policy servers:

Step 301: A UE attaches to a network side by interacting with a network device.

In this embodiment, a process of attaching to the network side by the UE is consistent with that in the prior art. In the attachment process, the UE needs to perfoini bidirectional authentication with the network side, and after the UE passes the authentication, the network device allocates an IP address for the UE, and the UE interacts, by using the IP address, with servers that are in an access network and include a first policy server and a second policy server. When the first policy server and the second policy server are servers on a same network side, the UE directly attaches to the network side. When the first policy server and the second policy server are servers on different network sides, the UE may select either one of the network sides for attachment, for example, when a 3GPP network and a WLAN network coexist, the UE may attach to the 3GPP network, or may attach to the WLAN network.

Step 302: The UE searches for a second policy server, and obtains an identifier of each found second policy server.

In this embodiment, a search area of the UE may include multiple second policy servers, and the UE may discover a second policy server in the search area by listening to a broadcast message and identifying an FQDN carried in the broadcast message, and obtain an identifier of each found second policy server.

Optionally, after finding each second policy server, the UE may establish a connection to each second policy server by using the allocated IP address, and then acquire policy information from the second policy server based on the established connection. When acquiring the policy information of each second policy server, the UE may send a policy request message to each second policy server, where the policy request message includes a UE identifier. In this embodiment, besides the UE identifier, the policy request message may further include at least one type of information in location information of the UE, capability information of the UE, whether the UE supports concurrent access, and a type of a policy requested by the UE. The capability information of the UE may further include at least one of whether the UE supports the protocol Hot Spot 2.0, whether the UE supports the protocol 802.11u, and whether the UE can read policy information sent by a second policy server. Each second policy server stores in advance a correspondence between the UE identifier and policy information to be allocated to the UE, where the policy information to be allocated to the UE is policy information that can be supported by the UE. After receiving the policy request message, each second policy server queries the stored correspondence according to the UE identifier included in the policy request message, to obtain the policy information to be allocated to the UE, and selects one piece of policy information for the UE from the obtained policy information, and each second policy server sends the selected policy information to the UE. Each second policy server may use an existing manner to select policy information for the UE, for example, if the obtained policy information has a priority, one piece of policy information with a highest priority is selected from the obtained policy information; for another example, if the policy request message further carries the location information of the UE, one piece of policy information matching the location information of the UE may be selected according to a location that the policy information applies to; for another example, if the policy request message includes the type of the policy requested by the UE, one piece of policy information matching the type may be selected. As can be seen from that, each second policy server can flexibly select policy information for the UE according to a requirement or information carried in the policy request message, which is not limited in this embodiment of the present invention. In addition, all the second policy servers in a network may store universal policy information; therefore, after receiving the policy request message, the second policy servers may use the universal policy information as second policy information.

After the UE obtains the policy information of each found second policy server, the UE may store a correspondence between the identifier and the policy information of each second policy server. For example, the UE may store the correspondence in a form of a list, where each entry includes an identifier and corresponding policy information of a second policy server.

In this embodiment, an identifier of a policy server is information that can uniquely identify the policy server, and the identifier may be an FQDN of the policy server, or an IP address of the policy server, or a name (Name) of the policy server, or a number (number) of the policy server, or the like.

Step 303: The UE sends a policy request message to a first policy server, where the policy request message includes a UE identifier and the identifier of each second policy server.

In this embodiment, besides the UE identifier and the identifier of the second policy server stored by the UE, the policy request message may further include at least one type of information in the location information of the UE, the capability information of the UE, whether the UE supports concurrent access, and the type of the policy requested by the UE. The capability information of the UE may further include at least one of whether the UE supports the protocol Hot Spot 2.0, whether the UE supports the protocol 802.11u, and whether the UE can read policy information sent by a second policy server.

Step 304: The first policy server selects first policy information for the UE according to the received policy request message.

In this embodiment, the first policy server stores in advance a correspondence between the UE identifier and policy information to be allocated to the UE, where the policy information to be allocated to the UE is policy information that can be supported by the UE. After receiving the policy request message, the first policy server queries the stored correspondence according to the UE identifier included in the policy request message, to obtain the policy information to be allocated to the UE, and selects one piece of policy information from the obtained policy information for the UE as the first policy information selected by the first policy server for the UE. For a specific manner for the first policy server to select the first policy information for the UE, reference may be made to the description in step 302. Details are not described herein again.

Step 305: The first policy server selects one second policy server for the UE according to the identifier of each second policy server.

In this embodiment, when selecting a second policy server, the first policy server may first select one second policy server from the identifier of each second policy server included in the policy request message, and use an identifier of the second policy server as a second identifier. When each second policy server included in the policy request message does not meet a requirement, the first policy server may further select one second policy server for the UE from an identifier of a second policy server stored by the first policy server. In this embodiment, a manner for selecting a second policy server is not limited, where the first policy server may select a second policy server based on the location information of the UE, for example, may select a second policy server nearest to a location of the UE.

Optionally, when the capability information of the UE in the policy request message sent by the UE includes whether the UE can read policy information sent by a second policy server, the first policy server may select a second identifier of a second policy server for the UE only when the information indicates yes.

Step 306: The first policy server returns a policy response message to the UE, where the policy response message includes the first policy information, a second identifier of the second policy server, and a policy convergence indication.

In this embodiment, the policy convergence indication is used for indicating a manner for the UE to converge the first policy information of the first policy server and second policy information of the second policy server. Several possible converging manners are as follows:

a first converging manner, in which a priority of the first policy information is higher than that of the second policy information, and the UE selects an access network according to the first policy information, and at the same time, the UE may ignore the second policy information or use the second policy information as a supplement to the first policy information;

a second converging manner, in which a priority of the second policy information is higher than that of the first policy information, and the UE selects an access network according to the second policy information, and at the same time, the UE may ignore the first policy information or use the first policy information as a supplement to the second policy infaimiation; and a third converging manner, in which the first policy information and the second policy information are converged.

The foregoing three converging manners are merely exemplary, and another converging manner may be used according to a requirement during actual application, which is not limited in this embodiment of the present invention.

In this embodiment of the present invention, which converging manner is configured by the first policy server is not limited, either. For example, the first policy server may configure the policy convergence indication according to a network identifier (PLMN ID) of the second policy server, where when the second policy server and the first policy server belong to a same network, the first policy server may configure the second converging manner, or when the second policy server and the first policy server belong to different networks, but a roaming relationship exists between the different networks, the first policy server may configure the first or third converging manner. For the third converging manner, if, for example, a policy in the first policy server includes an identifier of a target access network, and a policy in the second policy server includes other limiting conditions for the target access network, when the third converging manner is used, the user equipment first checks whether the target access network meets the limiting conditions in the policy provided by the second policy server. If the target access network meets the limiting conditions, the target access network can be accessed.

Step 307: The UE sends a policy request message to the corresponding second policy server according to the second identifier, where the policy request message includes the UE identifier.

When the second identifier of the target second policy server included in the policy response message is not an identifier in the correspondence stored by the UE, the UE may establish a connection to the second policy server corresponding to the second identifier in the policy response message, and send a policy request message to the second policy server, where the policy request message includes the UE identifier.

Optionally, similar to the policy request message sent to each second policy server in step 303, besides the UE identifier, the policy request message may further include at least one type of information in the location information of the UE, the capability infoi illation of the UE, whether the UE supports concurrent access, and the type of the policy requested by the UE. Details are not described herein again.

Step 308: The second policy server selects second policy information for the UE according to the received policy request message.

The second policy server stores in advance a correspondence between the UE identifier and policy information to be allocated to the UE, where the policy information to be allocated to the UE is policy information that can be supported by the UE. After receiving the policy request message, the second policy server queries the stored correspondence according to the UE identifier included in the policy request message, to obtain the policy informiation to be allocated to the UE, and selects one piece of policy information from the obtained policy information for the UE as the second policy information, and the second policy server sends the selected policy information to the UE. For a manner for the second policy server to select the policy information for the UE, reference may be made to the description in step 302. Details are not described herein again.

Step 309: The second policy server returns a policy response message to the UE, where the policy response message includes the second policy information.

Step 310: The UE converges the first policy information and the second policy information according to the policy convergence indication.

Step 311: The UE accesses a target network according to converged policy information.

With reference to the three possible converging manners described in step 306, when the policy convergence indication indicates the first converging manner, the UE may select an access network by using the first policy information; when the policy convergence indication indicates the second converging manner, the UE may select an access network by using the second policy information; or when the policy convergence indication indicates the third converging manner, if, for example, the first policy information includes multiple selectable access networks, the UE may select one first target access network in an existing manner, acquire current state information of the first target access network, check whether the current state information meets an access network selection condition specified by the second policy information, and if the current state information meets the access network selection condition, use the first target access network as the target access network of the UE, or if the current state information does not meet the access network selection condition, the UE reselects one first target access network in a descending order of the access networks in the first policy information, and repeats the previous operations until one first target access network meeting the access network selection condition specified by the second policy information is selected as the target access network of the UE; for another example, if the first policy information indicates that at a current location, a first-preferred target cell of the UE is an SSID1, and a second-preferred cell is an SSID2, and the second policy information indicates that at the current location, the UE can access the target cell SSID1 only when load on the SSID1 is less than 70%, and a second-preferred cell is an SSID3, the converged policy information may indicate that a current first-preferred target cell of the UE is the SSID1, load on the SSID1 is less than 70%, and a second-preferred target cell is the SSID2.

As can be seen from the foregoing embodiment, when there are at least two policy servers providing policy information to a UE at the same time, policy information of different policy servers can be converged, so that occurrence of policy conflict is prevented, and the UE can access a target network according to converged policy information.

Figure 4:
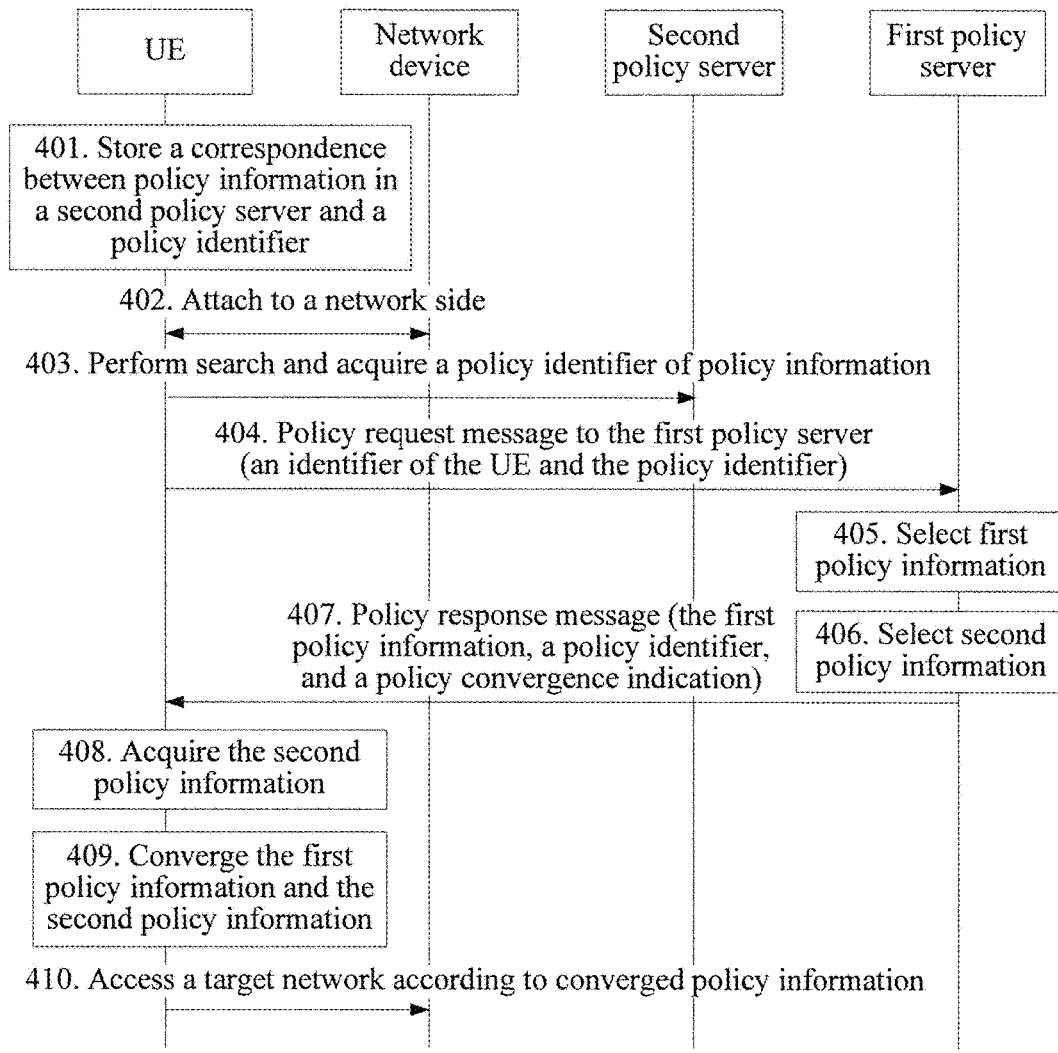
FIG. 4 is a flowchart of another embodiment of a method for policy converging according to the present invention.

Refer to FIG. 4, which is a flowchart of another embodiment of a method for policy converging according to the present invention. In this embodiment, policy convergence and network access processes are described by means of interaction between a UE and two policy servers:

Step 401: A first policy server stores in real time a correspondence between policy information of each second policy server in a network and a policy identifier.

In this embodiment, the first policy server may synchronously store, by interacting with a second policy server, a correspondence between policy information in the second policy server and a policy identifier. A policy identifier refers to an identifier that can uniquely identify each piece of policy information, and the policy identifier may consist of a second identifier of a second policy server and a unique identifier allocated by the second policy server to policy information.

Step 402: A UE attaches to a network side by interacting with a network device.

In this embodiment, a process of attaching to the network side by the UE is consistent with that in the prior art. In the attachment process, the UE needs to perform bidirectional authentication with the network side, and after the UE passes the authentication, the network device allocates an IP address for the UE, and the UE interacts, by using the IP address, with servers that are in an access network and include the first policy server and the second policy server. When the first policy server and the second policy server are servers on a same network side, the UE directly attaches to the network side. When the first policy server and the second policy server are servers on different network sides, the UE may select either one of the network sides for attachment, for example, when a 3GPP network and a WLAN network coexist, the UE may attach to the 3GPP network, or may attach to the WLAN network.

Step 403: The UE searches for a second policy server, and acquires a policy identifier of policy information from each found second policy server.

In this embodiment, a search area of the UE may include multiple second policy servers, and the UE may discover a second policy server in the search area by listening to a broadcast message and identifying an FQDN carried in the broadcast message. After finding each second policy server, the UE may establish a connection to each second policy server by using the allocated IP address, and then acquire a policy identifier of policy information from the second policy server based on the established connection.

Optionally, at the same time when acquiring the policy identifier, the UE may also acquire policy information in the second policy server. When acquiring the policy information of each second policy server, the UE may send a policy request message to each second policy server, where the policy request message includes a UE identifier. In this embodiment, besides the UE identifier, the policy request message may further include at least one type of information in location information of the UE, capability information of the UE, whether the UE supports concurrent access, and a type of a policy requested by the UE. The capability information of the UE may further include at least one of whether the UE supports the protocol Hot Spot 2.0, whether the UE supports the protocol 802.11u, and whether the UE can read policy information sent by a second policy server. Correspondingly, the UE may store a correspondence between policy information of a found second policy server and a policy identifier. For example, the UE may store the correspondence in a form of a list, where each entry includes a policy identifier and policy information.

Each second policy server stores in advance a correspondence between the UE identifier and policy information to be allocated to the UE, where the policy information to be allocated to the UE is policy information that can be supported by the UE. After receiving the policy request message, each second policy server queries the stored correspondence according to the UE identifier included in the policy request message, to obtain the policy information to be allocated to the UE, and selects one piece of policy information for the UE from the obtained policy information. Each second policy server may use an existing manner to select policy information for the UE, for example, if the obtained policy information has a priority, one piece of policy information with a highest priority is selected from the obtained policy information; for another example, if the policy request message further carries the location information of the UE, one piece of policy information matching the location information of the UE may be selected according to a location that the policy information applies to; for another example, if the policy request message includes the type of the policy requested by the UE, one piece of policy information matching the type may be selected. As can be seen from that, each second policy server can flexibly select policy information for the UE according to a requirement or information carried in the policy request message, which is not limited in this embodiment of the present invention.

In this embodiment, each second policy server configures a policy identifier for policy information, where the policy identifier consists of the second identifier of the second policy server and a unique identifier allocated by the second policy server for the policy information; therefore, at the same time when sending the selected policy information to the UE, each second policy server sends a policy identifier of the policy information.

Step 404: The UE sends a policy request message to the first policy server, where the policy request message includes a UE identifier and the policy identifier.

In this embodiment, besides the UE identifier and the policy identifier stored by the UE, the policy request message may further include at least one type of information in the location information of the UE, the capability information of the UE, whether the UE supports concurrent access, and the type of the policy requested by the UE. The capability information of the UE may further include at least one of whether the UE supports the protocol Hot Spot 2.0, whether the UE supports the protocol 802.11u, and whether the UE can read policy information sent by a second policy server.

Step 405: The first policy server selects first policy information for the UE according to the received policy request message.

In this embodiment, the first policy server stores in advance a correspondence between the UE identifier and policy information to be allocated to the UE, where the policy information to be allocated to the UE is policy information that can be supported by the UE. After receiving the policy request message, the first policy server queries the stored correspondence according to the UE identifier included in the policy request message, to obtain the policy information to be allocated to the UE, and selects one piece of policy information from the obtained policy information for the UE as the first policy information selected by the first policy server for the UE. For a specific manner for the first policy server to select the first policy information for the UE, reference may be made to the description in step 403. Details are not described herein again.

Step 406: The first policy server queries the stored correspondence between the policy information and the policy identifier according to the policy identifier included in the policy request message, to select one piece of second policy information for the UE.

In this embodiment, in step 401, the first policy server synchronously stores in real time the correspondence between the policy information of each second policy server in the network and the policy identifier; therefore, the first policy server may query the correspondence according to the policy identifier included in the policy request message, to obtain policy information corresponding to each policy identifier, and then select one piece of second policy information from the policy information.

When selecting one piece of second policy information from multiple pieces of policy information, the first policy server may select, in a descending order of priorities of all policy information of the multiple pieces of policy information, one piece of policy information with a highest priority as the second policy information.

Step 407: The first policy server returns a policy response message to the UE, where the policy response message includes the first policy information, a policy identifier of the second policy information, and a policy convergence indication.

In this embodiment, the policy convergence indication is used for indicating a manner for the UE to converge the first policy information of the first policy server and the second policy information of the second policy server. Several possible converging manners are as follows:

a first converging manner, in which a priority of the first policy information is higher than that of the second policy information, and the UE selects an access network according to the first policy information, and at the same time, the UE may ignore the second policy information or use the second policy information as a supplement to the first policy information;

a second converging manner, in which a priority of the second policy information is higher than that of the first policy information, and the UE selects an access network according to the second policy information, and at the same time, the UE may ignore the first policy information or use the first policy information as a supplement to the second policy information; and a third converging manner, in which the first policy information and the second policy information are converged.

The foregoing three converging manners are merely exemplary, and another converging manner may be used according to a requirement during actual application, which is not limited in this embodiment of the present invention.

In this embodiment of the present invention, which converging manner is configured by the first policy server is not limited, either. For example, the first policy server may configure the policy convergence indication according to a network identifier (PLMN ID) of the second policy server, where when the second policy server and the first policy server belong to a same network, the first policy server may configure the second converging manner, or when the second policy server and the first policy server belong to different networks, but a roaming relationship exists between the different networks, the first policy server may configure the first or third converging manner. For the third converging manner, if, for example, a policy in the first policy server includes an identifier of a target access network, and a policy in the second policy server includes other limiting conditions for the target access network, when the third converging manner is used, the user equipment first checks whether the target access network meets the limiting conditions in the policy provided by the second policy server. If the target access network meets the limiting conditions, the target access network can be accessed.

Step 408: The UE obtains the second policy information corresponding to the policy identifier included in the policy response message.

After the UE receives the policy response message, the second policy information corresponding to the policy identifier included in the policy response message is policy information selected by the first policy server. The UE may acquire, according to an identifier of a second policy server included in the policy identifier, the second policy information from the corresponding second policy server; or when in step 403, the UE further acquires the correspondence between the policy information and the policy identifier, the UE may query the correspondence according to the policy identifier to obtain the second policy information.

Step 409: The UE converges the first policy information and the second policy information according to the policy convergence indication.

Step 410: The UE accesses a target network according to converged policy information.

With reference to the three possible converging manners described in step 407, when the policy convergence indication indicates the first converging manner, the UE may select an access network by using the first policy information; when the policy convergence indication indicates the second converging manner, the UE may select an access network by using the second policy information; or when the policy convergence indication indicates the third converging manner, if, for example, the first policy information includes multiple selectable access networks, the UE may select one first target access network in an existing manner, acquire current state information of the first target access network, check whether the current state information meets an access network selection condition specified by the second policy information, and if the current state information meets the access network selection condition, use the first target access network as the target access network of the UE, or if the current state infoluiation does not meet the access network selection condition, the UE reselects one first target access network in a descending order of the access networks in the first policy information, and repeats the previous operations until one first target access network meeting the access network selection condition specified by the second policy information is selected as the target access network of the UE; for another example, if the first policy information indicates that at a current location, a first-preferred target cell of the UE is an SSID1, and a second-preferred cell is an SSID2, and the second policy information indicates that at the current location, the UE can access the target cell SSID1 only when load on the SSID1 is less than 70%, and a second-preferred cell is an SSID3, the converged policy information may indicate that a current first-preferred target cell of the UE is the SSID1, load on the SSID1 is less than 70%, and a second-preferred target cell is the SSID2.

As can be seen from the foregoing embodiment, when there are at least two policy servers providing policy information to a UE at the same time, policy information of different policy servers can be converged, so that occurrence of policy conflict is prevented, and the UE can access a target network according to converged policy information.

Figure 5:
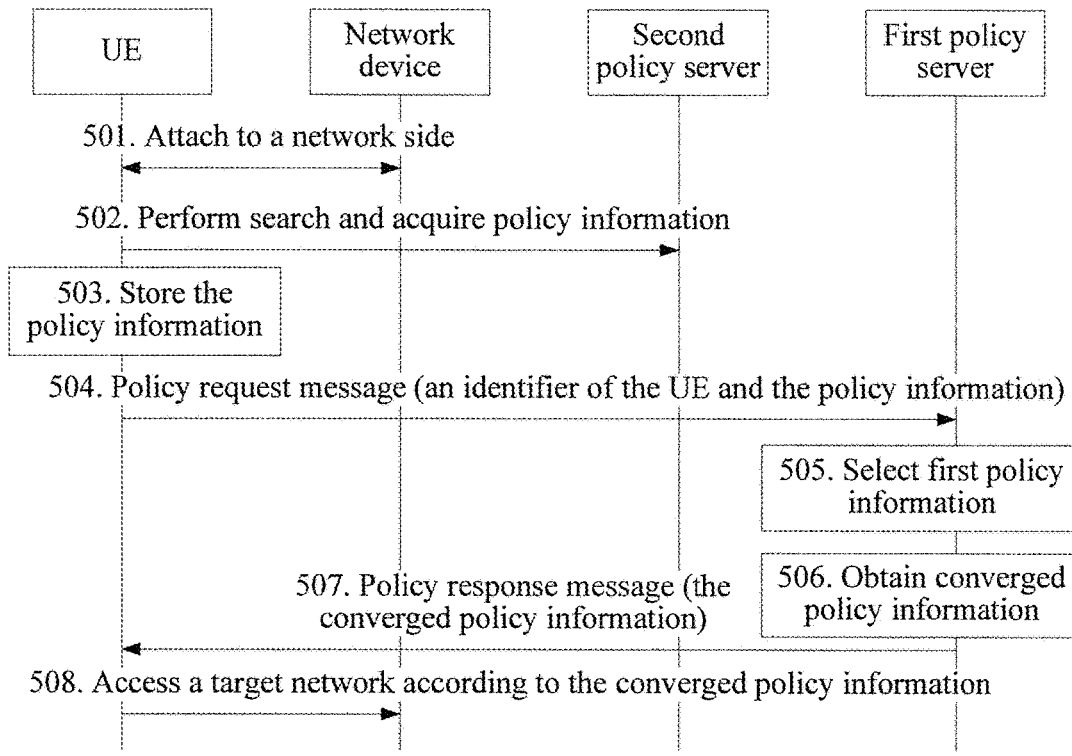
FIG. 5 is a flowchart of another embodiment of a method for policy converging according to the present invention.

Refer to FIG. 5, which is a flowchart of another embodiment of a method for policy converging according to the present invention. In this embodiment, policy convergence and network access processes are described by means of interaction between a UE and two policy servers:

Step 501: A UE attaches to a network side by interacting with a network device.

In this embodiment, a process of attaching to the network side by the UE is consistent with that in the prior art. In the attachment process, the UE needs to perform bidirectional authentication with the network side, and after the UE passes the authentication, the network device allocates an IP address for the UE, and the UE interacts, by using the IP address, with servers that are in an access network and include a first policy server and a second policy server. When the first policy server and the second policy server are servers on a same network side, the UE directly attaches to the network side. When the first policy server and the second policy server are servers on different network sides, the UE may select either one of the network sides for attachment, for example, when a 3GPP network and a WLAN network coexist, the UE may attach to the 3GPP network, or may attach to the WLAN network.

Step 502: The UE searches for a second policy server, and acquires policy information from each found second policy server.

In this embodiment, a search area of the UE may include multiple second policy servers, and the UE may discover a second policy server in the search area by listening to a broadcast message and identifying an FQDN carried in the broadcast message. After finding each second policy server, the UE may establish a connection to each second policy server by using the allocated IP address, and then acquire policy information from the second policy server based on the established connection.

When acquiring the policy information of each second policy server, the UE may send a policy request message to each second policy server, where the policy request message includes a UE identifier. In this embodiment, besides the UE identifier, the policy request message may further include at least one type of information in location information of the UE, capability information of the UE, whether the UE supports concurrent access, and a type of a policy requested by the UE. The capability information of the UE may further include at least one of whether the UE supports the protocol Hot Spot 2.0, whether the UE supports the protocol 802.11u, and whether the UE can read policy information sent by a second policy server.

Each second policy server stores in advance a correspondence between the UE identifier and policy information to be allocated to the UE, where the policy information to be allocated to the UE is policy information that can be supported by the UE. After receiving the policy request message, each second policy server queries the stored correspondence according to the UE identifier included in the policy request message, to obtain the policy information to be allocated to the UE, and selects one piece of policy information for the UE from the obtained policy information, and each second policy server sends the selected policy information to the UE. Each second policy server may use an existing manner to select policy information for the UE, for example, if the obtained policy information has a priority, one piece of policy information with a highest priority is selected from the obtained policy information; for another example, if the policy request message further carries the location information of the UE, one piece of policy information matching the location information of the UE may be selected according to a location that the policy information applies to; for another example, if the policy request message includes the type of the policy requested by the UE, one piece of policy information matching the type may be selected. As can be seen from that, each second policy server can flexibly select policy information for the UE according to a requirement or information carried in the policy request message, which is not limited in this embodiment of the present invention.

Step 503: The UE stores the policy information of each found second policy server.

Step 504: The UE sends a policy request message to a first policy server, where the policy request message includes a UE identifier and the stored policy information of the second policy server.

In this embodiment, besides the UE identifier and the policy information of the second policy server, the policy request message may further include at least one type of information in the location information of the UE, the capability information of the UE, whether the UE supports concurrent access, and the type of the policy requested by the UE. The capability information of the UE may further include at least one of whether the UE supports the protocol Hot Spot 2.0, whether the UE supports the protocol 802.11u, and whether the UE can read policy information sent by a second policy server.

Step 505: The first policy server selects first policy information for the UE according to the received policy request message.

In this embodiment, the first policy server stores in advance a correspondence between the UE identifier and policy information to be allocated to the UE, where the policy information to be allocated to the UE is policy information that can be supported by the UE.

After receiving the policy request message, the first policy server queries the stored correspondence according to the UE identifier included in the policy request message, to obtain the policy information to be allocated to the UE, and selects one piece of policy information from the obtained policy information for the UE as the first policy information selected by the first policy server for the UE. The first policy server may use an existing manner to select the first policy information for the UE, for example, if the obtained policy information has a priority, one piece of policy information with a highest priority is selected from the obtained policy information as the first policy information; for another example, if the policy request message further carries the location information of the UE, one piece of policy information matching the location information of the UE may be selected as the first policy information according to a location that the policy information applies to; for another example, if the policy request message includes the type of the policy requested by the UE, one piece of policy information matching the type may be selected as the first policy information. As can be seen from that, the first policy server can flexibly select the first policy information for the UE according to a requirement or information carried in the policy request message, which is not limited in this embodiment of the present invention.

Step 506: The first policy server converges the first policy information and the policy information of the second policy server to obtain converged policy information.

In this embodiment, the first policy server acquires, from the policy request message, multiple pieces of policy information from different second policy servers, and the first policy server converges the first policy information and the multiple pieces of policy information of the second policy servers. For example, the first policy information indicates that at a current location, a first-preferred target cell of the UE is an SSID1, and a second-preferred cell is an SSID2, one piece of second policy information indicates that at the current location, the UE can access the target cell SSID1 only when load on the SSID1 is less than 70%, and another piece of second policy information indicates that at the current location, a roaming user can access the target cell SSID1 only when load on the SSID1 is less than 60%; then if the first policy server determines that for the cell SSID1, a current user is a roaming user, the converged policy information may indicate that a current first-preferred target cell of the UE is the SSID1 only when load on the SSID1 is less than 60%, and a second-preferred cell is the SSID2.

Step 507: The first policy server returns a policy response message to the UE, where the policy response message includes the converged policy information.

Step 508: The UE accesses a target network according to the converged policy information.

In step 507, the policy response message returned by the first policy server includes the converged policy information; therefore, the UE can access the target network directly according to the converged policy information.

As can be seen from the foregoing embodiment, when there are at least two policy servers providing policy information to a UE at the same time, policy information of different policy servers can be converged, so that occurrence of policy conflict is prevented, and the UE can access a target network according to converged policy information.

Corresponding to the embodiments of the method for policy converging according to the present invention, the present invention further provides embodiments of a UE and a server.

Figure 6:
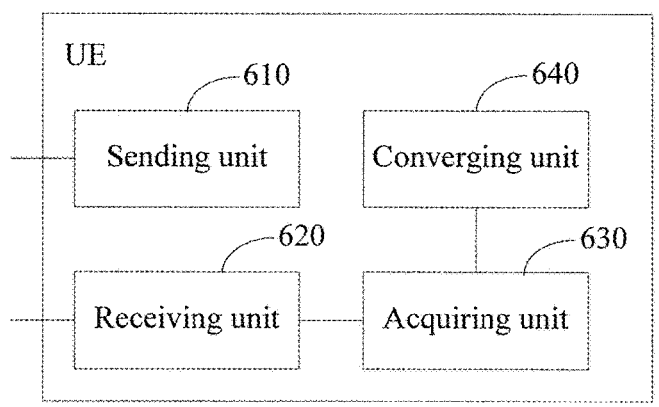
FIG. 6 is a block diagram of an embodiment of a UE according to the present invention.

Refer to FIG. 6, which is a block diagram of an embodiment of a UE according to the present invention.

The UE includes: a sending unit 610, a receiving unit 620, an acquiring unit 630, and a converging unit 640, where
the sending unit 610 is configured to send a policy request message to a first policy server;
the receiving unit 620 is configured to receive a policy response message from the first policy server, where the policy response message includes first policy information of the first policy server and information about at least one piece of second policy information, and the at least one piece of second policy information is policy information of at least one second policy server;
the acquiring unit 630 is configured to acquire the at least one piece of second policy information according to the information about the at least one piece of second policy information; and
the converging unit 640 is configured to converge, according to the policy response message, the first policy information and the at least one piece of second policy information to generate converged policy information.

Optionally, the information that is about the at least one piece of second policy information and included in the policy response message received by the receiving unit 620 is used as a policy convergence indication; or the policy response message received by the receiving unit 620 further includes a policy convergence indication.

Optionally, the policy convergence indication is used for indicating any one of the following converging manners:
the converged policy information is policy information with a highest priority in the first policy information and the at least one piece of second policy information;
for a same target access network, policy items in the converged policy information are a union set of a policy item in the first policy information and a policy item in the at least one piece of second policy information; and
for a same target access network, each policy item in the converged policy information is a policy item with a highest priority in policy items of a same type in the first policy information and the at least one piece of second policy information.

Optionally, the policy convergence indication is a policy convergence indication determined by the first policy server according to at least one relationship in a configuration relationship, a location relationship, and a roaming relationship between the first policy server and the at least one second policy server.

Optionally, the policy request message sent by the sending unit 610 includes an identifier of at least one second policy server found by the UE, so that the first policy server selects the at least one second policy server for the UE; or the policy request message sent by the sending unit 610 includes an identifier of at least one piece of second policy information of at least one second policy server found by the UE, so that the first policy server selects the identifier of the at least one piece of second policy information for the UE.

Optionally, when the policy request message sent by the sending unit 610 includes the identifier of the at least one second policy server found by the UE, the information that is about the at least one piece of second policy information and included in the policy response message received by the receiving unit 620 includes the identifier of the at least one second policy server; and when the policy request message sent by the sending unit 610 includes the identifier of the at least one piece of second policy information of the at least one second policy server found by the UE, the information that is about the at least one piece of second policy information and included in the policy response message received by the receiving unit 620 includes the identifier of the at least one piece of second policy information.

Optionally, the policy request message sent by the sending unit 610 includes capability information of the UE, where the capability information is used for indicating that the UE supports policy convergence, or used for indicating a converging manner supported by the UE, so that the first policy server selects, for the UE according to the converging manner supported by the UE, a converging manner used for generating the converged policy information.

Figure 7:
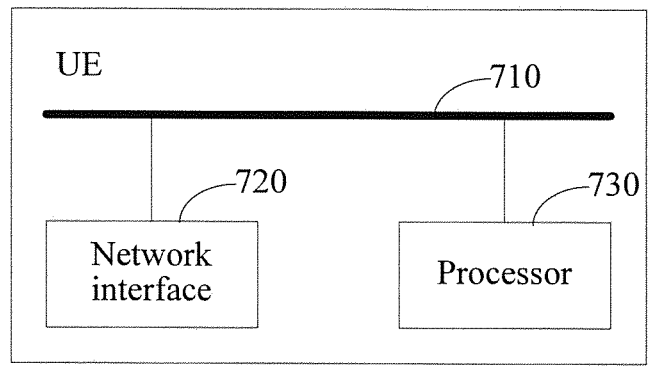
FIG. 7 is a block diagram of another embodiment of a UE according to the present invention.

Refer to FIG. 7, which is a block diagram of another embodiment of a UE according to the present invention.

The UE includes: a bus 710, and a network interface 720 and a processor 730 that are connected by using the bus 710, where
- the network interface 720 is configured to connect to a policy server in a network; and
- the processor 730 is configured to send a policy request message to a first policy server through the network interface 720; receive, through the network interface 720, a policy response message from the first policy server, where the policy response message includes first policy information of the first policy server and information about at least one piece of second policy information, and the at least one piece of second policy information is policy information of at least one second policy server; acquire the at least one piece of second policy information according to the information about the at least one piece of second policy information; and converge, according to the policy response message, the first policy information and the at least one piece of second policy information to generate converged policy information.

Optionally, the information that is about the at least one piece of second policy information and included in the policy response message received by the processor 730 through the network interface 720 is used as a policy convergence indication; or the policy response message received by the processor 730 through the network interface 720 further includes a policy convergence indication.

Optionally, the policy convergence indication is used for indicating any one of the following converging manners:
- the converged policy information is policy information with a highest priority in the first policy information and the at least one piece of second policy information;
- for a same target access network, policy items in the converged policy information are a union set of a policy item in the first policy information and a policy item in the at least one piece of second policy information; and
- for a same target access network, each policy item in the converged policy information is a policy item with a highest priority in policy items of a same type in the first policy information and the at least one piece of second policy information.

Optionally, the policy convergence indication is a policy convergence indication determined by the first policy server according to at least one relationship in a configuration relationship, a location relationship, and a roaming relationship between the first policy server and the at least one second policy server.

Optionally, the policy request message sent by the processor 730 through the network interface 720 includes an identifier of at least one second policy server found by the UE, so that the first policy server selects the at least one second policy server for the UE; or the policy request message sent by the processor 730 through the network interface 720 includes an identifier of at least one piece of second policy information of at least one second policy server found by the UE, so that the first policy server selects the identifier of the at least one piece of second policy information for the UE.

Optionally, when the policy request message sent by the processor 730 through the network interface 720 includes the identifier of the at least one second policy server found by the UE, the information that is about the at least one piece of second policy information and included in the policy response message received by the processor through the network interface includes the identifier of the at least one second policy server; and when the policy request message sent by the processor 730 through the network interface 720 includes the identifier of the at least one piece of second policy information of the at least one second policy server found by the UE, the information that is about the at least one piece of second policy information and included in the policy response message received by the processor through the network interface includes the identifier of the at least one piece of second policy information.

Optionally, the policy request message sent by the processor 730 through the network interface 720 includes capability information of the UE, where the capability information is used for indicating that the UE supports policy convergence, or used for indicating a converging manner supported by the UE, so that the first policy server selects, for the UE according to the converging manner supported by the UE, a converging manner used for generating the converged policy information.

Figure 8:
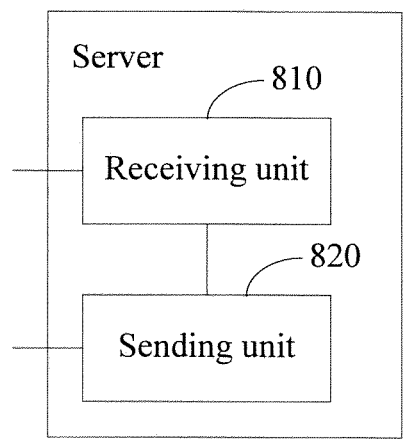
FIG. 8 is a block diagram of an embodiment of a server according to the present invention.

Refer to FIG. 8, which is a block diagram of an embodiment of a server according to the present invention. The server serves as a first policy server.

The server includes: a receiving unit 810 and a sending unit 820, where
- the receiving unit 810 is configured to receive a policy request message sent by user equipment UE; and
- the sending unit 820 is configured to send a policy response message to the UE, where the policy response message includes first policy information of the first policy server and information about at least one piece of second policy information, the at least one piece of second policy information is policy information of at least one second policy server, and the policy response message is used for instructing the UE to acquire the at least one piece of second policy information according to the information about the at least one piece of second policy information, and converge the first policy information and the at least one piece of second policy information to generate converged policy information.

Optionally, the information that is about the at least one piece of second policy information and included in the policy response message sent by the sending unit 820 is used as a policy convergence indication; or the policy response message sent by the sending unit 820 further includes a policy convergence indication.

Optionally, the policy convergence indication is used for indicating any one of the following converging manners:
- the converged policy information is policy information with a highest priority in the first policy information and the at least one piece of second policy information;
- for a same target access network, policy items in the converged policy information are a union set of a policy item in the first policy information and a policy item in the at least one piece of second policy information; and
- for a same target access network, each policy item in the converged policy information is a policy item with a highest priority in policy items of a same type in the first policy information and the at least one piece of second policy information.

Optionally, the server may further include (not shown in FIG. 8): a determining unit, configured to determine the policy convergence indication according to at least one relationship in a configuration relationship, a location relationship, and a roaming relationship between the first policy server and the at least one second policy server.

Optionally, the server may further include (not shown in FIG. 8): a first selecting unit, configured to: when the policy request message received by the receiving unit includes an identifier of at least one second policy server found by the UE, select the at least one second policy server for the UE; or when the policy request message received by the receiving unit includes an identifier of at least one piece of second policy information of at least one second policy server found by the UE, select the identifier of the at least one piece of second policy information for the UE.

Optionally, when the policy request message received by the receiving unit 810 includes the identifier of the at least one second policy server found by the UE, the information that is about the at least one piece of second policy information and included in the policy response message sent by the sending unit 820 includes the identifier of the at least one second policy server; and when the policy request message received by the receiving unit 810 includes the identifier of the at least one piece of second policy information of the at least one second policy server found by the UE, the information that is about the at least one piece of second policy information and included in the policy response message sent by the sending unit 820 includes the identifier of the at least one piece of second policy information.

Optionally, the policy request message received by the receiving unit 810 includes capability information of the UE, where the capability information is used for indicating that the UE supports policy convergence, or used for indicating a converging manner supported by the UE; and the server may further include (not shown in FIG. 8): a second selecting unit, configured to: when the capability information is used for indicating a converging manner supported by the UE, select, for the UE according to the converging manner supported by the UE, a converging manner used for generating the converged policy information.

Figure 9:
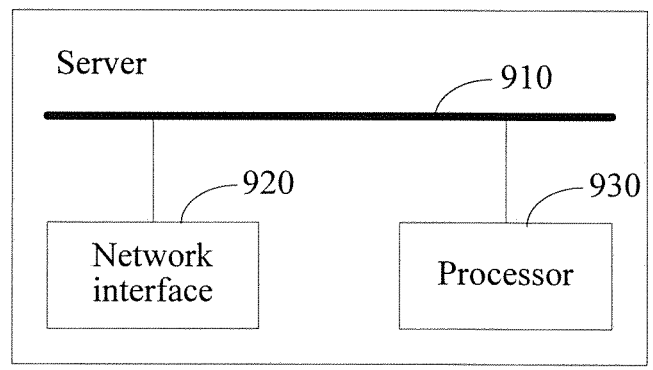
FIG. 9 is a block diagram of another embodiment of a server according to the present invention.

Refer to FIG. 9, which is a block diagram of another embodiment of a server according to the present invention. The server serves as a first policy server.

The server includes: a bus 910, and a network interface 920 and a processor 930 that are connected by using the bus 910, where the network interface 920 is configured to connect to a UE in a network; and the processor 930 is configured to receive, through the network interface 920, a policy request message sent by the user equipment UE, and send a policy response message to the UE through the network interface 920, where the policy response message includes first policy information of the first policy server and information about at least one piece of second policy information, the at least one piece of second policy information is policy information of at least one second policy server, and the policy response message is used for instructing the UE to acquire the at least one piece of second policy information according to the information about the at least one piece of second policy information, and converge the first policy information and the at least one piece of second policy information to generate converged policy information.

Optionally, the information that is about the at least one piece of second policy information and included in the policy response message sent by the processor 930 through the network interface 920 is used as a policy convergence indication; or the policy response message sent by the processor 930 through the network interface 920 further includes a policy convergence indication.

Optionally, the policy convergence indication is used for indicating any one of the following converging manners:

the converged policy information is policy information with a highest priority in the first policy information and the at least one piece of second policy information;

for a same target access network, policy items in the converged policy information are a union set of a policy item in the first policy information and a policy item in the at least one piece of second policy information; and for a same target access network, each policy item in the converged policy information is a policy item with a highest priority in policy items of a same type in the first policy information and the at least one piece of second policy information.

Optionally, the processor 930 may be further configured to determine the policy convergence indication according to at least one relationship in a configuration relationship, a location relationship, and a roaming relationship between the first policy server and the at least one second policy server.

Optionally, the processor 930 is further configured to: when the policy request message received through the network interface 920 includes an identifier of at least one second policy server found by the UE, select the at least one second policy server for the UE; or when the policy request message received through the network interface 920 includes an identifier of at least one piece of second policy information of at least one second policy server found by the UE, select the identifier of the at least one piece of second policy information for the UE.

Optionally, when the policy request message received by the processor 930 through the network interface 920 includes the identifier of the at least one second policy server found by the UE, the information that is about the at least one piece of second policy information and included in the policy response message sent by the processor 930 through the network interface 920 includes the identifier of the at least one second policy server; and when the policy request message received by the processor 930 through the network interface 920 includes the identifier of the at least one piece of second policy information of the at least one second policy server found by the UE, the information that is about the at least one piece of second policy information and included in the policy response message sent by the processor 930 through the network interface 920 includes the identifier of the at least one piece of second policy information.

Optionally, the policy request message received by the processor 930 through the network interface 920 includes capability information of the UE, where the capability information is used for indicating that the UE supports policy convergence, or used for indicating a converging manner supported by the UE; and the processor 930 may be further configured to: when the capability information is used for indicating a converging manner supported by the UE, select, for the UE according to the converging manner supported by the UE, a converging manner used for generating the converged policy information.

As can be seen from the foregoing embodiments, a UE sends a policy request message to a first policy server; the first policy server receives a policy response message, where the policy response message includes first policy information of the first policy server and information about at least one piece of second policy information, and the at least one piece of second policy information is policy information of at least one second policy server; and the UE acquires the at least one piece of second policy information according to the information about the at least one piece of second policy information, and converges, according to the policy response message, the first policy information and the at least one piece of second policy information to generate converged policy information. By applying the embodiments of the present invention, when there are at least two policy servers providing policy information to a UE at the same time, policy information of different policy servers can be converged, so that occurrence of policy conflict is prevented, and the UE can access a target network according to converged policy information.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for policy converging, the method comprising:
   sending, by user equipment (UE), a policy request message to a first policy server;
   receiving, by the UE, a policy response message from the first policy server, wherein the policy response message comprises first policy information of the first policy server and information about at least one piece of second policy information of at least one second policy server;
   acquiring, by the UE, the at least one piece of second policy information according to the information about the at least one piece of second policy information; and
   converging, by the UE according to the policy response message, the first policy information and the at least one piece of second policy information to generate converged policy information;
   wherein the policy request message comprises capability information of the UE for indicating a converging manner supported by the UE, to enable the first policy server to select, for the UE according to the converging manner supported by the UE, a converging manner used for generating the converged policy information.

2. The method according to claim 1, wherein the information about the at least one piece of second policy information is used as a policy convergence indication.

3. The method according to claim 1, wherein the policy response message further comprises a policy convergence indication.

4. The method according to claim 3, wherein the policy convergence indication is used for indicating the following converging manner:
   for a same target access network, policy items in the converged policy information are a union set of a policy item in the first policy information and a policy item in the at least one piece of second policy information.

5. The method according to claim 3, wherein the policy convergence indication is a policy convergence indication determined by the first policy server according to at least one relationship in a configuration relationship, a location relationship, and a roaming relationship between the first policy server and the at least one second policy server.

6. The method according to claim 1, wherein:
   the policy request message comprises an identifier of at least one second policy server found by the UE, so that the first policy server selects the at least one second policy server for the UE; or
   the policy request message comprises an identifier of at least one piece of second policy information of at least one second policy server found by the UE, so that the first policy server selects the identifier of the at least one piece of second policy information for the UE.

7. The method according to claim 6, wherein:
   when the policy request message comprises the identifier of the at least one second policy server found by the UE, the information that is about the at least one piece of second policy information and comprised in the policy response message comprises the identifier of the at least one second policy server; and
   when the policy request message comprises the identifier of the at least one piece of second policy information of the at least one second policy server found by the UE, the information that is about the at least one piece of second policy information and comprised in the policy response message comprises the identifier of the at least one piece of second policy information.

8. A user equipment (UE), comprising:
   a bus;
   a network interface coupled to the bus and configured to connect to a policy server in a network; and
   a processor coupled to the bus and configured to:
   send a policy request message to a first policy server through the network interface,
   receive, through the network interface, a policy response message from the first policy server, wherein the policy response message comprises first policy infollnation of the first policy server and infoiiiiation about at least one piece of second policy information of at least one second policy server,
   acquire the at least one piece of second policy information according to the information about the at least one piece of second policy information, and
   converge, according to the policy response message, the first policy information and the at least one piece of second policy information to generate converged policy information,
   wherein the policy request message sent by the processor through the network interface comprises capability information of the UE for indicating a converging manner supported by the UE, to enable the first policy server to select, for the UE according to the converging manner supported by the UE, a converging manner used for generating the converged policy information.

9. The UE according to claim 8, wherein the policy response message received by the processor through the network interface further comprises a policy convergence indication.

10. The UE according to claim 9, wherein the policy convergence indication is used for indicating any one of the following converging manners:
for a same target access network, policy items in the converged policy information are a union set of a policy item in the first policy information and a policy item in the at least one piece of second policy information.

11. The UE according to claim 9, wherein the policy convergence indication is a policy convergence indication determined by the first policy server according to at least one relationship in a configuration relationship, a location relationship, and a roaming relationship between the first policy server and the at least one second policy server.

12. The UE according to claim 8, wherein:
the policy request message sent by the processor through the network interface comprises an identifier of at least one second policy server found by the UE, so that the first policy server selects the at least one second policy server for the UE; or
the policy request message sent by the processor through the network interface comprises an identifier of at least one piece of second policy information of at least one second policy server found by the UE, so that the first policy server selects the identifier of the at least one piece of second policy information for the UE.

13. The UE according to claim 12, wherein:
when the policy request message sent by the processor through the network interface comprises the identifier of the at least one second policy server found by the UE, the information that is about the at least one piece of second policy information and comprised in the policy response message received by the processor through the network interface comprises an identifier of the at least one second policy server; and
when the policy request message sent by the processor through the network interface comprises the identifier of the at least one piece of second policy information of the at least one second policy server found by the UE, the information that is about the at least one piece of second policy information and comprised in the policy response message received by the processor through the network interface comprises the identifier of the at least one piece of second policy information.

* * * * *